July 15, 1952     R. REPPERT     2,603,672
COVER CONSTRUCTION FOR STORAGE BATTERY CELLS
Filed Nov. 4, 1949     2 SHEETS—SHEET 1
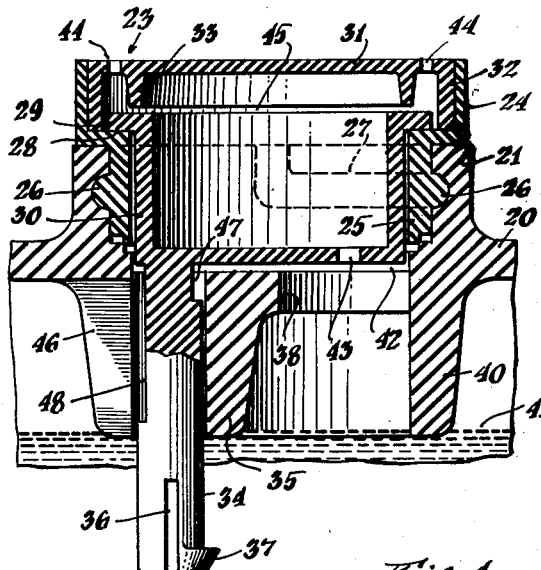
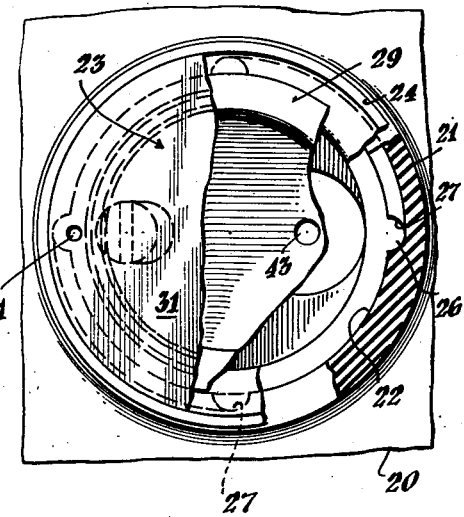
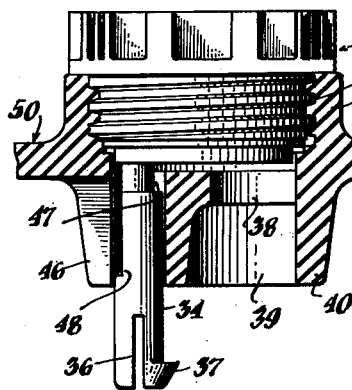
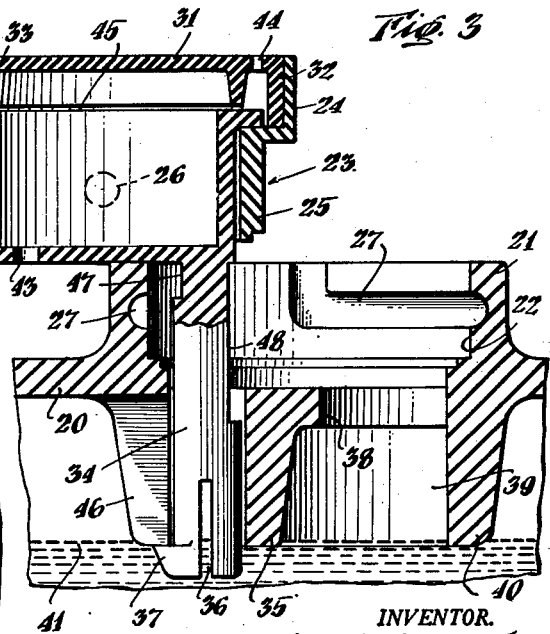
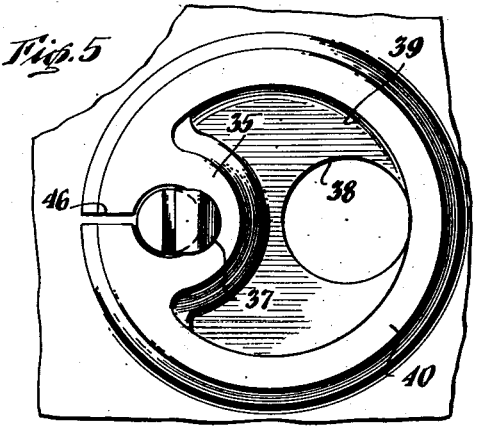
INVENTOR.
Roland Reppert
BY Robert S. Dunlap
ATTORNEY

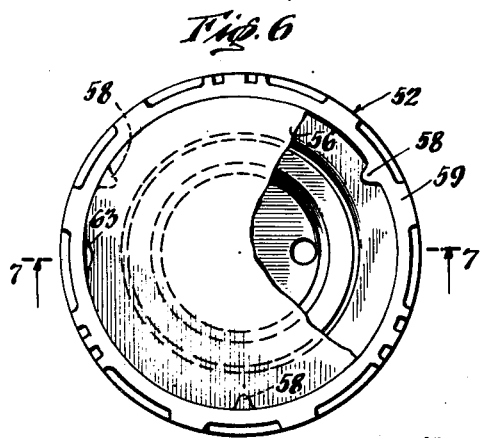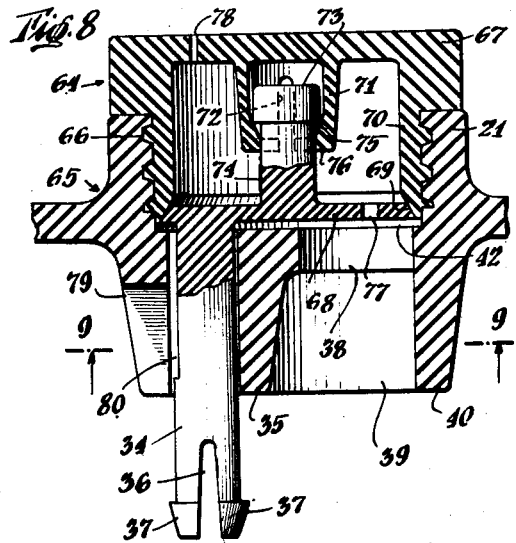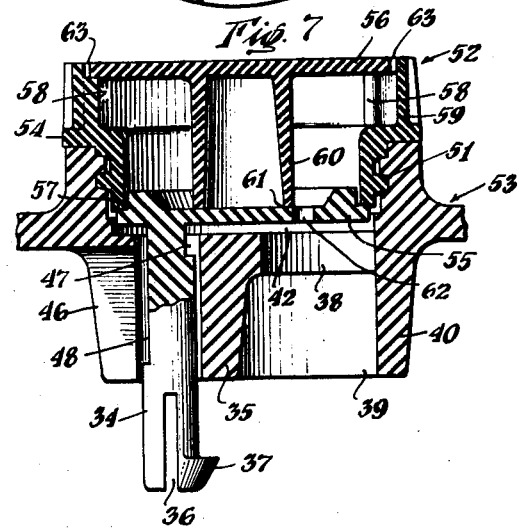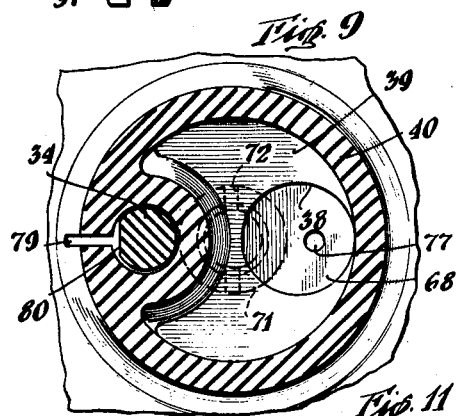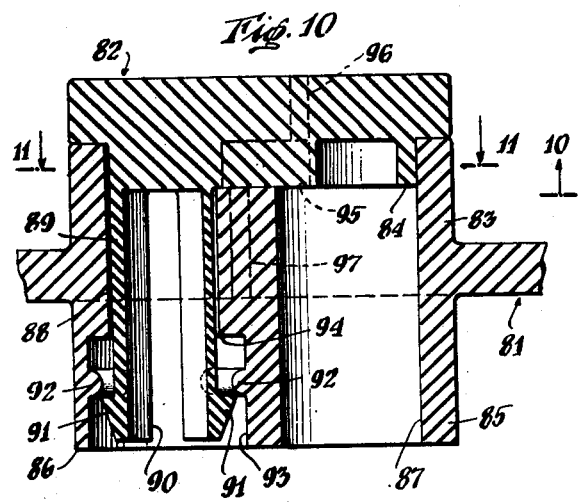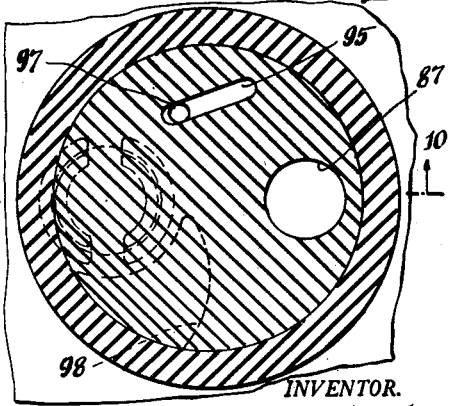
INVENTOR.
Roland Reppert
BY
Robert S. Dunlap
ATTORNEY Patented July 15, 1952

2,603,672

UNITED STATES PATENT OFFICE 2,603,672

COVER CONSTRUCTION FOR STORAGE BATTERY CELLS

Roland Reppert, Pelham Manor, N. Y., assignor to American Hard Rubber Company, New York, N. Y., a corporation of New York Application November 4, 1949, Serial No. 125,592

16 Claims. (Cl. 136—177)

The present invention relates to a cover construction for a storage battery cell, and more particularly to an improved type of cover construction including a cap means which may be suitably secured in a recess in the cover of a storage battery cell to close a filling opening for the cell and which may be moved to one side when desired to permit the filling of the cell, while preventing bodily removal of the cap means such as might intail the loss thereof. Incident to these features, the cover construction is provided with a non-overfilling arrangement in a more or less conventional manner and with a valve means, permitting the normal venting of gases from the cell during the ordinary operation of the battery and while the cap means associated with the cover is in its closed position.

Among the objects of the present invention are to provide a cover and an associated means for a storage battery cell having the following features:

1. The cap means should be tightly seated upon the cover during the normal operation of the battery to prevent leakage of battery electrolyte therethrough;

2. The cap means is so arranged that it cannot be bodily removed from the cover incident to filling the battery cell;

3. A non-overfill arrangement is provided including a filling opening through which water or electrolyte may be added, but the addition being limited so that the level of the electrolyte in the battery may not be raised beyond a desired point;

4. Means are provided for normal venting of the gases from the battery during normal operation and while the cap means is in its closed position;

5. Means are provided for closing off the normal venting, so as to enable the proper operation of the non-overfill means, during the time that the cap means is swung to one side of the filling opening, for permitting the filling of the battery; and 6. Means are provided to prevent the closing of the cap means by movement to its normally closed position from displacing liquid which may have been filled up to the top of the reentrant seat in which the cap means is located at its closed position, particularly by arranging that the normal venting passages shall be opened solely by movement of the cap means to a position above and in vertical alignment with the seat with which it cooperates.

Further objects of the present invention involve the provision of various types of mechanisms, which will accomplish the above outlined purposes.

In summary, the invention comprises apparatus having all the several functions above enumerated in a practical type construction.

Other and more detailed objects of the present invention will become apparent from the following specification and appended claims, all when considered with the accompanying drawings, in which:

Figure 1 is a fragmentary view substantially in central, vertical section showing one embodiment of the invention, and particularly illustrating a portion of a storage battery cell cover and a cap means in its closed position in association therewith;

Fig. 2 is a view of the apparatus of Fig. 1, principally in plan, but with parts broken away to show the interior construction;

Fig. 3 is a view similar to Fig. 1 but with the cap means swung to its open or battery cell filling position;

Fig. 4 is a view generally similar to Fig. 1 showing a second embodiment of the invention;

Fig. 5 is a bottom plan view of the embodiment of the invention shown in Fig. 4;

Fig. 6 is a top plan view, with parts broken away and in section similar to Fig. 2, of a third embodiment of the invention;

Fig. 7 is a view similar to Fig. 1 showing the embodiment of Fig. 6 in substantially vertical section on the line 7—7 thereof;

Fig. 8 is a view in substantially vertical section similar to Fig. 1, showing a fourth and preferred embodiment of the invention;

Fig. 9 is an inverted, horizontal sectional view taken substantially on the line 9—9 of Fig. 8.

Fig. 10 is a fragmentary view in substantially vertical section similar to Fig. 1 of a fifth embodiment of the invention, the view being taken substantially on the line 10—10 of Fig. 11; and Fig. 11 is a view substantially in horizontal section on the line 11—11 of Fig. 10.

Referring first to the form of invention shown in Figs. 1 to 3 inclusive, there is illustrated a battery cell cover, which may be made in a substantially conventional manner and of conventional materials. In this connection the only requirements as to the materials to be used in constructing any of the parts of the devices disclosed in this case is that they be acid-resistant or resistant against such other chemicals as are used as the electrolyte in the storage battery cell, and that they have the necessary physical properties, particularly mechanical strength, and in some instances a certain amount of resilience, so as to make the parts reasonably strong and permanent in use. It has been found, for example, that hard rubber compositions are admirably suited for this purpose. It has also been found that some of the synthetic organic plastic materials, such as polystyrene, are suitable, particularly for the construction of the cap means. These types of material specifically mentioned and other similar materials are particularly favored as they may be molded into the desired forms without requiring much, if any, machining following the molding operation. With the exceptions hereinabove noted, the present invention is not restricted by or in any way related to the composition of the materials used.

A cover 20 is provided in a substantially conventional manner with an upwardly extending annular wall 21 forming a reentrant seat 22, in which there is adapted to be seated a cap means generally indicated at 23, this cap means being shown in its closed or seated position in Fig. 1 and in its open or cell-filling position in Fig. 3.

While various types of holding means may be provided for preventing undesired relative movement of the cap means 23 from its closed position by accidental dislodgment, and particularly by accidental relative movement between the cap means and the cover in a direction axial of the cap means, there is shown in Fig. 1 a means comprising particularly a bayonet joint for securing these parts together. As shown in Figs. 1 and 3, the cap means comprises a first part 24 having a downwardly projected, substantially cylindrical portion 25, which is provided with one or more outwardly directed bosses 26. As shown two such bosses are provided, which cooperate respectively with substantially L-shaped bayonet joint type slots or grooves 27. Thus, the cap means 23 may be seated and held in its closed position as shown in Fig. 1 by a combined axial and rotative movement, starting from a position of the cap means 23 in vertical alignment with the reentrant seat 22.

The cap means 23 shown in Fig. 1 is a three-part cap, the first part 24 having been described hereinabove. The part 24 is further provided with an upwardly directed shoulder 28, on which is arranged to seat an outwardly extending flange 29 of a second part 30, which is formed cup-shaped, as best shown in Fig. 1, and which is intended for free rotation in respect to the part 24 about the vertical axis of the cap means 23. The purpose of this relative rotation of these two parts of the cap means will appear more clearly hereinafter.

To assist in centering the cap means part 30, and more particularly to prevent undesired axial movement thereof, a third part 31 of the cap means is provided. This part 31 has the general form of a substantially circular disc having a downwardly extending annular flange 32 arranged to be telescoped within the upper portion of the part 24 as shown. The part 31 also has a downwardly extending annular flange 33 which is disposed above the flange 29 of the part 30. The flange 32 may be suitably secured to the first named part 24 of the cap means by a suitable adhesive or by any other appropriate means (not shown). Thus, in the completed cap, the parts 24 and 31 are rigid with one another, while the part 30 is freely rotatable in respect to both about the axis of the cap means 23.

In the form of the invention of Figs. 1 to 3 the lower part of the cap means 23, and particularly the part 30 thereof, is provided with a downwardly extending stem 34, which is arranged to extend through a substantially circular bearing formed by a substantially annular flange 35 depending from the cover 20. The stem 34 may be rigid or integral with the part 30; and the flange 35 may likewise be rigid or integral with the cover 20. The lower end of the stem 34 is bifurcated, as shown at 36, and is provided with one or more lateral projections or toes 37, only one being shown in this form of the invention. In practice the toe or projection 37 serves to prevent undesired bodily removal of the cap means 23 from the cover 20 by engaging the under-side of the end of the flange 35, as shown in Fig. 3. This projection thus serves to limit the vertical upward movement of the cap means 23. The stem 34, being mounted upon the rotatable portion 30, also serves as a pivot pintle, permitting the rotation of the cap means 23 between a position in alignment with the reentrant seat 22 and a position permitting the filling of the battery cell as shown in Fig. 3. This prevents bodily removal and hence possible loss of the cap means 23 during the normal operation of the battery. The bifurcation 36 at the lower end of the stem 34 permits the assembly of the parts by permitting the movement together of the bifurcated lower end portions of the stem 34, so that the stem may be moved vertically downwardly through the bearing formed in the flange 35. At the same time, if it becomes necessary, the cap means may be bodily removed from the cover 20 by first pinching together the lower or bifurcated portions of the stem, then moving the cap means bodily vertically upwardly.

When the cap means 23 is in its open position, as seen in Fig. 3, it is desired that the battery may be filled with water or electrolyte. For this purpose an aperture 38 is formed communicating between the inside of the reentrant seat 22 and the underside of the cover through a large passage 39. This passage 39 is defined laterally by an annular, but not necessarily circular, downwardly extending flange 40, depending from and rigid or integral with the cover 20. A part of the flange 40 may also serve as a part of the flange 35 providing the bearing for the stem 34.

As generally set forth above, it is desired that the cell cover construction of the present invention provide a non-overfill arrangement for the battery cell. To this end it is desired that the level of the electrolyte in the battery cell be at about the point 41, Fig. 3, which is the level of the lower end portions of the flanges 35 and 40. At the same time it is necessary during the normal operation of the conventional storage batteries to permit the escape of gas. For this reason venting means must be provided in the cover or in the cap means associated therewith.

As shown, the cap means 23 in its seated position, Fig. 1, is so designed and disposed in respect to the reentrant seat 22 as to provide a space 42 beneath the cap means and within reentrant seat 22. This space, which is maintained in communication with the space above the electrolyte level 41 by passage means hereinafter described, is preferably vented to the atmosphere through the cap means. For this purpose the part 30 of the cap means may be provided with one or more apertures 43 communicating between the space 42 and the interior of the cap means. This interior space may in turn be vented to the atmosphere through one or more apertures 44, two of which are shown, formed in the top part 31 of the cap means. Due to the fact that the aperture 43 is never in vertical alignment with any of the apertures 44, any liquid electrolyte which may splash upwardly through the operture 43 will not be permitted to flow or splash outwardly through the apertures 44, but will run back harmlessly to the interior of the battery cell. This is assured by the provision of the downwardly extending flange 33, leaving but a small space 45 between it and the upper surface of the flange 29, as shown in Figs. 1 and 3.

The passage means serving to vent the space within the cell to the space 42 during the normal operation of the battery comprises a radial slot 46 formed in the flange 35 defining the bearing for the stem 34 and extending from the lower end of this flange upwardly substantially to the level of the underside of the cover 20. This slot communicates with the space 42, either through an annular groove 47 formed in the stem 34 and located adjacent to the underside of the cover 20 and the upper end of the slot 46, as shown in Fig. 1, or through a cut-out segment 48 formed in the stem and extending downwardly from a level adjacent to the underside of the cover 20 to a point above the lower end of the flange 35. In either case there is an open through passage from the space above the electrolyte in the battery and beneath the cover 20 around the flange 40 to the space 42, so that the passages 38 and 39 are not required for venting purposes when the cap means 23 is in its closed position.

When, however, the cap means 23 is swung to the battery filling position, Fig. 3, it is necessary to the non-overfill arrangement that the venting of the space above the electrolyte and outside the flange 40 be cut off from communication with the atmosphere. For this purpose the stem 34 acts as a valve in addition to its function as a pivot pintle and serves to obstruct communication between the slot 46 and the atmosphere. At this position of the cap means, Fig. 3, the annular groove 47 is wholly above the top end of the slot 46, so as to be completely out of communication therewith, and the cut away segment 48 of the stem is rotated to a position opposite that of the slot 46. Thus, it is impossible to overfill the battery even though water or electrolyte be added sufficiently to fill the space 39, the aperture 38 and the entire reentrant seat 22 up to the top of the flange 21.

A further feature of the present invention is the preventing of liquid displacement by moving the cap means downwardly into the reentrant seat 22 before the space above the electrolyte within the battery is vented to the atmosphere. For this purpose it is desired that a venting passage be reestablished solely incident to movement of the cap means to a position in alignment with the reentrant seat and without requiring vertical movement of the cap means toward the seat. As will be seen by a comparison of Figs. 1 and 3, when the cap means 23 is rotated from the Fig. 3 position about the vertical axis of the stem 34, which is eccentric of and within the seat 22, then the cut away segment 48 will be brought into radial alignment with the slot 46, permitting direct venting to the atmosphere of the portion of the battery outside the flange 40, and hence permitting any liquid or electrolyte within the filling opening to flow downwardly into the battery proper. Thus when the cap means 23 is subsequently depressed or moved downwardly to its closed position shown in Fig. 1, no liquid will be displaced thereby and spilled around the outside of the battery. This is important in the event that the liquid being filled into the battery is corrosive in character, such as sulphuric acid. For this purpose the cut away segment 48 extends to a point as shown in Fig. 3 where the bottom end thereof will be below the underside of the cover 20 and the upper end of the slot 46 and may be rotated by rotation of the cap means to a position to communicate with the upper end portion of the slot 46. In this connection it will be obvious from the foregoing description that the provision of a slot at 46 is merely a convenient construction, the only necessary requirement, however, being that there be an aperture adjacent to the level of the underside of the cover 20, and in a substantially radial direction communicating between the inside of the bearing for the stem 34 and the space beneath the cover 20 and outside the flange 40. One or more holes in lieu of the slot 46 would serve this purpose.

From the foregoing it will be obvious that the form of the invention of Fig. 1 secures all the advantages enumerated above and provides in a single, conveniently unitary structure for the securing of all these advantageous functions.

The form of the invention shown in Figs. 4 and 5 differs from that of Figs. 1 to 3 solely by the provision of different means for holding the cap means here shown at 49 to the cover here generally indicated at 50. In this case, instead of providing a bayonet joint as indicated by the reference characters 26 and 27 in Figs. 1 to 3, there are provided conventional type molded screw threads 51 between the outer part corresponding to the part 24 of the cap means 23 and the inner surface of the flange 21 defining the reentrant seat for the cap means 49. Thus, again the cap means is moved to its closed position shown in Fig. 4 from a position above and in vertical alignment therewith by a combined axial and rotative movement. The remaining portions of the apparatus of Figs. 4 and 5 correspond respectively to the similar portions of the form of Figs. 1 to 3 and are similarly numbered. The functions are substantially the same and will be obvious from the foregoing description and the drawings.

The form shown in Figs. 6 and 7 includes a somewhat different construction for the cap means here generally indicated at 52, which is shown cooperating with a cover generally indicated at 53. The cover 53 may be substantially the same as that shown at 20 in Figs. 1 to 3 and at 50 in Figs. 4 and 5 with the exception that the means for securing the cap means to the cover comprise screw threads 51, substantially the same as in Figs. 4 and 5.

Again the cap means is a three part construction, two parts of which are rotatable in respect to the third part. In the present instance, however, the part of the cap means 52 provided with the screw threads 51 is indicated at 54 and is per se rotatable in respect to the other two parts of the cap means, which are secured to one another as hereinafter set forth. These other parts comprise a second or under part 55 and a third or upper part 56. The under part 55 carries the stem 34 rigid or integral therewith, and is arranged to bear against the under surface 57 of the part 54. The upper part 56 is supported upon the upper ends of a series of inwardly directed ribs 58, which may be integral with an upwardly extending portion 59 of the first named part 54. The upper part 56 has an annular flange 60 depending therefrom, the lower edge portions of which may be cemented or otherwise secured to the under part 55, as shown at 61. The dimensions of the flange 60 are such that the parts 55 and 56 embrace portions of the part 54, but in a manner such that the part 54 may be freely rotated to unscrew the cap means from the cover 53 without rotation of the parts 55 and 56, which is prevented by the eccentric disposition of the stem 34. The cap means 52 may then be swung to one side about the axis of the stem 34 in the same way as the cap 23 in the Fig. 1 form.

In this embodiment of the invention the venting means through the cap means 52 comprises an aperture 62 through the under part 55 as shown and a series of preferably two or more scalloped portions 63 formed in the outer periphery of the part 56 and of less radial inward extent than the ribs 58 by which the part 56 is supported, as best seen in Fig. 6. Thus, there is provided an indirect passage for venting gases through the cap means 52 from the space 42 therebeneath in the reentrant seat in the cover 53 as described for the Figs. 1 to 3 form.

The remaining parts of the device are essentially similar to the form of Figs. 1 to 3; and the operation essentially the same, so that both should be obvious from the foregoing description and the drawings.

The form of the invention of Figs. 8 and 9, which is the presently preferred form, includes a two-part cap means generally indicated at 64, which cooperates with a cover generally indicated at 65 by the provision of screw threads 66. In this instance the cap means comprises an upper part 67 carrying the screw thread 66 and a lower part 68. The lower part 68 has an outwardly beveled surface at its outer periphery as indicated at 69 cooperating with a correspondingly beveled surface on the downwardly projected or skirt portion 70 of the upper part 67. For holding these parts in assembled relation, the upper part 67 is provided with a downwardly extending hollow boss 71, which is formed with two or more slots 72 therein and is arranged to receive a knob-like portion 73 formed on the upper end of a stud 74 projecting centrally upwardly from the lower part 68. The knob-like portion 73 is provided with a downwardly directed shoulder portion 75, which engages an inwardly directed flange portion 76 of the hollow boss member 71.

The parts 67 and 68 may be assembled together by pushing the knob portion 73 of the stem 74 into the hollow part of the boss 71 until the inwardly directed flange portions 76 engage over the shoulder 75. This is permitted by the flexing of the material of the boss 71, which in turn is facilitated by the provision of the slots 72. The dimensions of the parts are such that the part 68 is made freely rotatable in respect to the part 67 and vice versa, so as to permit the screwing in of the cap part 67 in moving the cap means to its normally closed position shown in Fig. 8, while rotation of the part 68 is prevented by the eccentric disposition of the stem 34 which is rigid with the part 68 as in the forms of the invention described above.

Provision is made for venting the space 42 beneath the cap means 64 to the atmosphere through the cap means and in manner similar to that described in connection with previous forms of the invention, particularly by the provision of one or more apertures 77 in the lower part 68 and 78 in the upper part 67. These apertures are preferably so arranged and disposed as to be out of alignment with one another while the cap is in its closed position as shown in Fig. 8.

The construction of the stem 34 in the form of the invention of Fig. 8 is substantially similar to that shown in the previous figures, in that it is provided at its lower end with a bifurcation 36, but in this instance there is provided two toes or laterally extended portions 37 instead of one as in the previous figures.

Another slight difference between the form of Figs. 8 and 9 and previous figures lies in the fact that a radial slot 79, which corresponds generally to the slot 46 of Figs. 1–7, does not extend upwardly as far in the flange 35. Similarly, there is no annular groove corresponding to the groove 47, but the cut-out segment 80, Figs. 8 and 9, is provided, corresponding to the cut-out segment 48; and extending completely to the top of the stem to communicate with the space 42 as shown. These variations may sometimes be desired in an actual construction, such as that shown in Figs. 8 and 9.

The remainder of the parts correspond structurally and functionally to the similarly numbered parts hereinabove described in connection with the Fig. 1 form of the invention. The operation of the device of Figs. 8 and 9 should now be obvious from the foregoing description along with the drawings.

A desired function of the form of Figs. 8 and 9 is that the upper part 67 forms a tight seal for the filling opening during the normal operation of the battery, while permitting the necessary venting of gases from the upper part thereof. At the same time all the above-enumerated desirable functions for a device of the present invention are preserved in and provided by a simple structure for the cap means having but two parts.

Turning now to the form of invention shown in Figs. 10 and 11, there is provided a cover generally indicated at 81 with which cooperates a one-piece cap means generally indicated at 82. As in previous forms of the invention, the cover is provided with an upwardly extending flange 83 defining a reentrant seat for a downwardly projecting portion generally indicated at 84 of the cap means 82. There is also provided a downwardly extending flange 85, which may be rigid or integral with the cover 81 and which defines by its lower end a level 86 which is desired for the electrolyte of the associated battery. Within the flange 85 is a through passage 87 serving as a filling opening for the battery and shown in the present instance as a round hole. Eccentric of the center of the reentrant seat is an aperture 88, formed as a cylindrical hole and serving as a bearing for a downwardly extending hollow stem 89, which is bifurcated, as shown at 90. The lower bifurcated end portions of the stem 89 have outwardly extending flange or toe parts 91, which in the present instance serve a dual function. In the closed position of the cap means, shown in Fig. 10, the toe parts 91 are positioned beneath and in resilient contact with semi-annular flange portions 92 positioned in an enlarged part 93 or counter-bore which is aligned with the bore 88. The resilient engagement of the toe parts 91 beneath the flange parts 92 serves to hold the cap means 82 against accidental dislodgment in a vertical direction, and in this instance is used in place of the bayonet joints or screw threads shown and described in connection with previous forms of the invention. When the cap means 82 is moved upwardly, the toe portions 91, springing over the flanges 92 for this purpose, serve as positive stops by engagement with a shoulder 94 at the juncture of the counter-bore 93 and the bore 88. This prevents complete bodily disengagement of the cap means from the cover means in the normal use of the device in the same manner as the toe parts 37 engaging the lower end of the flange 35 prevent such bodily disengagement in previous forms of the invention.

In the present instance the indirect venting passage for gas to the atmosphere during normal operation is provided by an elongate slot 95 extending upwardly from the lower face of the cap means proper and a bore 96 communicating with one end of the slot 95, at the right as seen in Fig. 10. At the closed position of the cap means 82 on the cover, the opposite (left) end of the slot 95 is in alignment with a bore 97, which is formed in the cover 81 and which communicates between the inside of the seat for the cap means, and particularly with the slot 95 at its upper end, and with the space beneath the cover 81 around and outside the flange 85 at its lower end. Thus when the cap means 82 is in its closed position, as shown in Fig. 10, there is an indirect venting passage opening from the upper portion of the battery cell through the bore 97, the slot 95 and the bore 96 to the atmosphere.

The cap means 82 is also provided with a sort of sector-shaped downward projection 98, best shown in Fig. 11, which extends below the level of the lower part of the projected portion 84 and fits loosely into a suitable recess formed therefor in the cover 81. When the cap means is raised until the upper end portions of the projections or toes 91 engage the shoulder 94, and then swung laterally to a position corresponding to that shown in Fig. 3, the projection 98 is thereby raised out of the recess in the cover and swung into vertical alignment with the bore 97. Due to the dimensions of the parts, i. e. the specifically limited distance which the cap means 82 can be raised, this projection 98 will be in close valving contact with the upper end of the bore 97, so as to stop any venting action therethrough. In this way the non-overfill function of the device is preserved; and it is impossible to fill more than the desired amount of liquid into the battery, so that the level of the electrolyte therein will be preserved at about the level 86. Upon again rotating the cap 82 about the eccentric axis of the hollow stem 89, the projection 98 will be swung out of alignment with the bore 97; so that in this form also the reestablishing of the venting of the battery is effected solely by movement of the cap means into alignment with the reentrant seat and undesired displacement of liquid is prevented.

While I have shown and described several possible embodiments of the invention and have explained the principles thereof, other and different embodiments will occur to those skilled in the art from the foregoing description and drawings. I do not wish to be limited, therefore, except by the scope of the appended claims, which are to be construed validly as broadly as the state of the prior art permits.

What is claimed is:

1. A cover construction for a storage battery cell, comprising a cell cover means having a reentrant seat formed therein for a cap means, a cap means cooperable with said seat and having a portion which is projected axially of said cap means into said reentrant seat in the closed position of said cap means on said cover means, means for preventing accidental dislodgment of said cap means in said closed position by preventing accidental relative movement between said cap means and said cover in a direction axial of said cap means, means including a downwardly extending annular flange rigid with said cover means providing a filling opening for said cell communicating with the interior of said reentrant seat, pivot means connecting said cap means and said cover means providing for the rotation of said cap means with respect to said cover about a vertical axis eccentric of said seat, said pivot means including a stem carried by one of the two means consisting of said cap means and said cover means and a bearing for said stem formed in the other of said two means, said stem being axially slidable in said bearing in addition to being rotatable therein, interlocking means between said stem and said bearing preventing more than a predetermined relative axial movement thereof to prevent total bodily removal of said cap means from said cover means in the normal use of the entire construction; an indirect vent passage through said cover construction effective to vent the upper portion of an associated storage battery cell when said cap means is in its closed position, said indirect vent passage including passage means in said cap means and passage means in said cover means communicating with said passage means in said cap means and with the space beneath said cover outside said downwardly extending annular flange at the closed position of said cap means, means for closing off the venting of the said space outside said annular flange at the open position of said cap means at which it is raised out of said seat and swung laterally about said eccentric axis, and means responsive to the swinging of said cap means about said eccentric axis to a position in alignment with said seat, and independent of any vertical movement of said cap means toward said seat for establishing a venting connection through at least a part of said indirect vent passage between said space outside said annular flange and the atmosphere outside the storage battery cell.

2. A cover construction for a storage battery cell, comprising a cell cover having a reentrant seat formed therein for a cap means, a cap means cooperable with said seat and having a portion which is projected axially of said cap means into said reentrant seat in the closed position of said cap means on said cover, means for preventing accidental dislodgment of said cap means in said closed position by preventing accidental relative movement between said cap means and said cover in a direction axial of said cap means, means including a downwardly extending annular flange rigid with said cover providing a filling opening for said cell communicating with the interior of said reentrant seat, pivot means connecting said cap means and said cover providing for the rotation of said cap means with respect to said cover about a vertical axis eccentric of said seat, said pivot means including a stem carried by said cap means and a bearing formed in said cover means for receiving said stem in a way such that said stem is rotatable and axially movable in said bearing, interlocking means between said stem and said bearing preventing more than a predetermined relative axial movement thereof to prevent total bodily removal of said cap means from said cover in the normal use of the entire construction; an indirect vent passage through said cover construction effective to vent the upper portion of an associated storage battery cell when said cap means is in its closed position, said indirect vent passage including passage means in said cap means and passage means in said cover communicating with said passage means in said cap means and with the space beneath said cover outside said downwardly extending annular flange at the closed position of said cap means, means for closing off the venting of the said space outside said annular flange at the open position of said cap means at which it is raised out of said seat and swung laterally about said eccentric axis, and means responsive to the swinging of said cap means about said eccentric axis to a position in alignment with said seat, and independent of any vertical movement of said cap means towards said seat, for establishing a venting connection through at least a part of said indirect vent passage between said space outside said annular flange and the atmosphere outside the storage battery cell.

3. A cover construction for storage battery cell in accordance with claim 1, wherein said means for preventing accidental dislodgment in said cap means comprises screw threads on said cap means and in said seat arranged for engagement with one another.

4. A cover construction for storage battery cell in accordance with claim 1, wherein said means for preventing accidental dislodgment of said cap means comprises at least one boss on said cap means extending outward therefrom and engaging a bayonet slot formed in said reentrant seat.

5. A cover construction for storage battery cell in accordance with claim 1, wherein said means for preventing accidental dislodgement of said cap means comprises cooperating members on said stem and said bearing including a bifurcated end portion of said stem, at least one of the bifurcations having an outwardly directed toe portion, and an inwardly directed rib formed inside a part of said bearing and cooperable with said toe portion of said stem, whereby the bifurcation of said stem permits a resilient movement of the bifurcations thereof, so that the stem may be assembled within said bearing, and whereby the toe portion of said stem may resiliently engage said inwardly directed rib and may be flexed to move over it incident to the movement of said cap means to and from its closed position on said cover means.

6. A cover construction for a storage battery cell, comprising a cell cover having a reentrant seat formed therein for a cap means, a cap means cooperable with said seat and having a portion which is projected axially of said cap means into said reentrant seat in the closed position of said cap means on said cover, means for preventing accidental dislodgment of said cap means in said closed position by preventing accidental relative movement between said cap means and said cover in a direction axial of said cap means, means including a downwardly extending annular flange rigid with said cover providing a filling opening for said cell communicating with the interior of said reentrant seat, pivot means connecting said cap means and said cover providing for the rotation of said cap means with respect to said cover about a vertical axis eccentric of said seat, said pivot means including a stem carried by said cap means and a bearing formed in said cover means for receiving said stem in a way such that said stem is rotatable and axially movable in said bearing, said stem having a bifurcated lower end and being of material such that the bifurcated end portions of the stem may be resiliently flexed toward one another, a toe on the end of at least one of said bifurcated portions arranged to cooperate with a part of said bearing preventing relative movement of said cap means away from said cover by more than a predetermined amount in the normal use of the entire construction; an indirect vent passage through said cover construction effective to vent the upper portion of an associated storage battery cell when said cap means is in its closed position, including passage means in said cap means and passage means in said cover communicating with said passage means in said cap means and with the space beneath said cover outside said downwardly extending annular flange at the closed position of said cap means, means for closing off the venting of the said space outside said annular flange at the open position of said cap means when it is raised out of said seat and swung laterally about said eccentric axis, and means responsive to the swinging of said cap means about said eccentric axis to a position in vertical alignment with said seat, and independent of any vertical movement of said cap means toward said seat, for establishing a venting connection through at least a part of said indirect vent passage between said space outside said annular flange and the atmosphere outside the storage battery cell.

7. A cover construction for a storage battery cell, comprising a cell cover having a reentrant seat formed therein for a cap means, a cap means cooperable with said seat and having a portion which is projected axially of said cap means into said reentrant seat in the closed position of said cap means on said cover, means for preventing accidental dislodgment of said cap means in said closed position by preventing accidental relative movement between said cap means and said cover in a direction axial of said cap means, means including a downwardly extending annular flange rigid with said cover providing a filling opening for said cell communicating with the interior of said reentrant seat, pivot means connecting said cap means and said cover providing for the rotation of said cap means with respect to said cover about a vertical axis eccentric of said seat, said pivot means including a stem carried by said cap means and a bearing formed in said cover for receiving said stem in a way such that said stem is rotatable and axially movable in said bearing, said bearing including a downwardly extending annular flange rigid with said cover, interlocking means between said stem and a lower portion of the flange of said bearing preventing more than a predetermined relative axial movement thereof to prevent total bodily removal of said cap means from said cover in the normal use of the entire construction; an indirect vent passage in said cap means between the underside thereof and the atmosphere outside said cap means through which gases may be vented from inside said cell when said cap means is in said closed position on said cover, a passage through one side of the flange of said bearing adjacent to the underside of said cover, a cut-away portion of said stem positioned opposite the last named passage when said cap means is in its closed position and forming a part of a venting passage to the underside of said cap means in said closed position thereof, and a cut-away segment of said stem communicating between said cut-away portion and a zone along said stem opposite said last named passage when said cap means is raised in respect to said cover but is in alignment with said seat, a part of said stem other than said cut-away segment and said cut-away portion serving as a valve to close said last named passage when said cap means is rotated about said eccentric axis to a cell-filling position, whereby venting of the upper portion of said cell beneath said cover is prevented when said cap means is swung to its cell-filling position about said eccentric axis and a venting passage between the upper portion of said cell and the atmosphere is opened solely by rotating said cap means about said eccentric axis to a position in vertical alignment with said seat.

8. A cover construction for a storage battery cell in accordance with claim 7, wherein said last named passage is formed as a radial slot extending from the lower end of the flange of said bearing to a point adjacent to the underside of said cover, wherein said cut-away portion of said stem is an annular groove formed in said stem at a level below the upper end of said slot at the closed position of said cap means on said cover, wherein said seat is formed to provide a space at the lower end thereof at the closed position of said cap means, which space extends from a zone in communication with said annular groove across the underside of said cap means and communicates with said indirect vent passage in said cap means, and wherein said cut-away segment of said stem extends from said annular groove toward the lower end of said stem a distance substantially less than the vertical extent of said radial slot.

9. A cover construction for a storage battery cell, comprising a cell cover having a reentrant seat formed therein for a cap means, a cap means having all portions rigid with one another and cooperable with said seat, said cap means having a portion which is projected axially thereof into said reentrant seat in the closed position of said cap means on said cover, means including a downwardly extending annular flange rigid with said cover providing a filling opening for said seat communicating with the interior thereof, pivot means connecting said cap means and said cover providing for the rotation of said cap means with respect to said cover about a vertical axis eccentric of said seat, said pivot means including a bifurcated stem carried by said cap means and a bearing formed in said cover means for receiving said stem, said stem and said bearing being constructed and arranged so that said cap is rotatable and axially movable in said bearing, at least one outwardly extended toe portion on said stem, a shoulder forming a part of said bearing cooperable with said toe portion for limiting the vertical upward movement of said cap means, detent means cooperating with said stem and said toe portion thereof for resiliently preventing accidental dislodgment of said cap means from said cover in the normal use of the cover construction, and an indirect vent passage for venting said battery cell when said cap means is at said closed position including a passage through said cover outside said downwardly extending annular flange and communicating between the underside of said cover and a point within said reentrant seat, and passage means in said cap means having a portion aligned with the passage in said cover at the closed position of said cap means and a communicating portion of said passage means out of alignment with the passage in said cover means but communicating therewith and with the atmosphere when said cap means is in its closed position; and a valve means formed rigid with said cap means and arranged to be disposed in vertical alignment with the passage in said cover for closing it when said cap means is rotated about the axis of said stem to a position for the filling of the associated battery cell.

10. A cover construction for a storage battery cell, comprising a cell cover having a reentrant seat formed therein for a cap means, a two-part cap means cooperable with said seat including an upper part having a portion which is projected axially of said cap means into said reentrant seat in the closed position of said cap means on said cover, means including interengaging portions of said seat and said projected portion of said cap means for preventing accidental dislodgement of said cap means from said cover, said cap means being movable from said closed position to a cell filling position by a combined rotative movement and axial movement of said upper part in respect to said cover, means including a downwardly extending annular flange rigid with said cover providing a filling opening for said cell communicating with the interior of said reentrant seat, pivot means connecting said cap means with said cover providing for the rotation of said cap means with respect to said cover about a vertical axis within and eccentric of said seat, said pivot means including a lower part of said cap means which is freely rotatable in respect to said upper part thereof about an axis concentric with said seat in the closed position of said cap means, means securing the upper and lower parts of said cap means against bodily removal from one another while permitting free relative rotation therebetween, a stem rigid with said lower part, a bearing formed in said cover for receiving said stem in a way such that said stem is rotatable and axially movable in said bearing, cooperating means carried by said bearing and said stem for limiting movement of said cap means vertically away from said cover, said seat and said cap means being so constructed and arranged to provide a space within said seat below said cap means at the closed position of said cap means, indirect passage means formed in said upper and lower parts of said cap means for venting said space to the atmosphere when said cap means is in its closed position, and valve means formed in part by said bearing and in part by said stem for providing an open venting passage to said space from the interior of said cell outside said downwardly extending annular flange when said cap means is in its closed position and for closing said venting passage when said cap means is raised and rotated about the axis of said stem for filling said cell, said valve means being moved to a cell-venting position solely by rotation of said cap means to a position in alignment with said seat and being independent of vertical movement of said cap means into said seat.

11. A cover construction for a storage battery cell in accordance with claim 10, wherein said upper part of said cap means is formed as a cup-shaped member having an annular wall which is arranged for engagement with said reentrant seat, a slotted hollow boss rigid with said cup-shaped member depending downwardly centrally thereof, and wherein said lower part of said cap means includes an upwardly directed stud rigid therewith and arranged to be loosely received in said slotted hollow boss, said slotted hollow boss and said stud having inter-engaging portions and constituting said means securing said upper and lower parts of said cap means against bodily removal from one another while permitting free relative rotation therebetween.

12. A cover construction for a storage battery cell in accordance with claim 10, wherein said means including inter-engaging portions of said seat and said projected portion of said cap means for preventing accidental dislodgment of said cap means for said cover comprises screw threads molded on the outside periphery of said projected portion of said upper part of said cap means and cooperating screw threads molded in said reentrant seat of said cover.

13. A cover construction for a storage battery cell in accordance with claim 10, wherein said means including inter-engaging portions of said seat and said projected portion of said cap means for preventing accidental dislodgment of said cap means from said cover comprises screw threads molded on the outside periphery of said projected portion of said upper part of said cap means and cooperating screw threads molded in said reentrant seat of said cover, wherein said stem has a lower bifurcated end portion and has at least one of its bifurcated end portions provided with a laterally extending toe, and wherein said bearing is formed in part within a downwardly extending annular flange of such dimensions in respect to the length of said stem and so disposed in respect to said toe that upon upward movement of said stem in said bearing, said toe will engage the lower end of the flange of said bearing to limit axial movement of said cap means vertically away from said cover, said annular flange of said bearing being provided with a radial slot extending upwardly from the lower end thereof, and said stem having a cut-away segment extending downwardly toward, but stopping short of, the lower end thereof and positioned to be in radial alignment with said slot when said cap means is vertically aligned with said seat, said slot and said cut-away segment forming parts of said venting passage for venting the upper portion of said cell when said cap means is in its closed position.

14. A cover construction for a storage battery cell, comprising a cell cover having a reentrant seat formed therein for a cap means, a cap means having three parts, two of which are secured together and are freely rotatable in respect to the third, cooperating with said seat, said cap means including one part having a substantially cylindrical portion which is projected axially of said cap means into said reentrant seat in the closed position of said cap means on said cover, means including inter-engaging portions on said one part and said seat for preventing accidental dislodgment of said cap means from said cover, said cap means being movable from said closed position to a cell-filling position by a combined rotative and axial movement of said one part in respect to said cover, one part of said cap means being secured rigidly to another of the parts thereof to confine the third of said parts therebetween in a manner providing for free relative rotation between said third part on the one hand and the other two parts on the other, means including a downwardly extending annular flange rigid with said cover providing a filling opening for said cell communicating with the interior of said reentrant seat, pivot means connecting said cap means with said cover providing for the rotation of said cap means with respect to said cover about a vertical axis within and eccentric of said seat, said pivot means including a stem rigid with a freely rotatable part of said cap means, a bearing formed in said cover for receiving said stem in a way such that said stem is rotatable and axially movable in said bearing, cooperating means carried by said bearing and said stem for limiting movement of said cap means vertically away from said cover, said seat and said cap means being so constructed and arranged to provide a space within said seat below said cap means at the closed position of said cap means, indirect passage means formed in said cap means for venting said space when said cap means is in its closed position, and valve means formed in part in said bearing and in part by said stem for providing an open venting passage to said space from the interior of said cell outside said annular flange when said cap means is in its closed position and for closing said venting passage when said cap means is raised and rotated about the axis of said stem for filling said cell, said valve means being moved to a cell-venting position solely by rotation of said cap means to a position in alignment with said seat and being independent of vertical movement of said cap means into said seat.

15. A cover construction for a storage battery cell in accordance with claim 14, wherein said cap means comprises as its three parts an outer part having inter-engaging portions cooperating with mating inter-engaging portions of said seat, said outer part including an upwardly directed annular shoulder, wherein a second part of said cap means includes an outwardly extending flange rotatably seated upon said shoulder, and wherein the third part of said cap means is secured to the first-named part and has a portion disposed above said outwardly extending flange of said second part so as to confine said second part against substantial movement axially of said cap means while permitting free rotation thereof about the axis of said cap means.

16. A cover construction for a storage battery cell, comprising a cell cover means having a screw threaded reentrant seat formed therein for a cap means, a cap means cooperable with said seat and having a screw threaded portion, which is projected axially of said cap means and threaded into said reentrant seat in the closed position of said cap means on said cover means, means including a downwardly extending annular flange rigid with said cover means providing a filling opening for said cell communicating with the interior of said reentrant seat, pivot means connecting said cap means and said cover means providing for the rotation of said cap means with respect to said cover about a vertical axis eccentric of said seat, said pivot means including a stem carried by said cap means and a bearing for said stem formed in said cover means, said stem being axially slidable in said bearing in addition to being rotatable therein, interlocking means between said stem and said bearing preventing more than a predetermined relative axial movement thereof to prevent total bodily removal of said cap means from said cover means in the normal use of the entire construction; an indirect vent passage through said cover construction effective to vent the upper portion of an associated storage battery cell when said cap means is in its closed position, said indirect vent passage including passage means in said cap means and passage means in said cover means communicating with said passage means in said cap means and with the space beneath said cover outside said downwardly extending annular flange at the closed position of said cap means, and means for closing off the venting of the said space outside said annular flange at the open position of said cap means at which it is raised out of said seat and swung laterally about said eccentric axis.

ROLAND REPPERT.

REFERENCES CITED

The following references are of record in the file of this patent:

UNITED STATES PATENTS

| Number | Name | Date |
|---|---|---|
| 1,269,096 | Land | June 11, 1918 |
| 1,702,998 | Foltis | Feb. 19, 1929 |
| 1,916,158 | Dudley | June 27, 1933 |
| 1,986,313 | Winger | Jan. 1, 1935 |
| 2,220,005 | Smith | Oct. 29, 1940 |
| 2,302,719 | Sandusky | Nov. 24, 1942 |
| 2,302,720 | Sandusky | Nov. 24, 1942 |
| 2,346,313 | Keller | Apr. 11, 1944 |
| 2,506,952 | Doughty | May 9, 1950 |

FOREIGN PATENTS

| Number | Country | Date |
|---|---|---|
| 145,387 | Great Britain | July 2, 1920 |
| 851,026 | France | Jan. 2, 1940 |